(12) United States Patent
Lunden

(10) Patent No.: US 6,661,448 B2
(45) Date of Patent: Dec. 9, 2003

(54) METHOD AND SYSTEM FOR PROVIDING AND TRANSMITTING ALTERNATIVE VIDEO DATA DURING INTERRUPTIONS IN VIDEO TRANSMISSIONS

(75) Inventor: Vesa Lunden, Lempäälä (FI)

(73) Assignee: Nokia Mobile Phones Ltd., Espoo (FI)

( * ) Notice: Subject to any disclaimer, the term of this patent is extended or adjusted under 35 U.S.C. 154(b) by 238 days.

(21) Appl. No.: 09/891,772

(22) Filed: Jun. 26, 2001

(65) Prior Publication Data

US 2001/0048463 A1 Dec. 6, 2001

(30) Foreign Application Priority Data

Jun. 30, 2000 (FI) .............................. 20001575

(51) Int. Cl.⁷ ............................... H04N 7/14
(52) U.S. Cl. ................. 348/14.02; 348/14.11
(58) Field of Search .................... 348/14.01, 14.02, 348/14.07, 14.08, 14.11, 14.12

(56) References Cited

U.S. PATENT DOCUMENTS

| 5,963,246 A | * | 10/1999 | Kato ........................ 348/14.01 |
| 5,995,490 A | | 11/1999 | Shaffer et al. .............. 370/260 |
| 6,515,695 B1 | * | 2/2003 | Sato et al. ................ 348/14.08 |

FOREIGN PATENT DOCUMENTS

| DE | 19757246 A1 | 6/1999 |
| DE | 19806977 A1 | 8/1999 |
| JP | 4-154290 | * 5/1992 |
| JP | 6-296277 | * 10/1994 |
| JP | 9-214915 | * 8/1997 |

OTHER PUBLICATIONS

*English translation of the Abstract attached.
**English translation of the Abstract attached.
English Abstract of Japanese Patent document No.: JP 8140143.

* cited by examiner

*Primary Examiner*—Wing Chan
(74) *Attorney, Agent, or Firm*—Perman & Green, LLP

(57) ABSTRACT

A method and system for transmitting an alternative video or multimedia data file during an interrupted video transmission in, for example, a mobile video telephony system. In a first aspect of the invention, the method includes interrupting the video signal (200) which then automatically initiates downloading of a video data file from a storage medium (205,206) into a memory (120) for transmission to viewers over the mobile telephony system during the interruption in the video transmission. In a second aspect, a pre-encoded multimedia data file is stored on a storage medium (310) and downloaded into the video telephony system for playback to viewers during the interruption thereby providing a more enjoyable and possibly more informative viewing experience. In a third aspect, a software generated image is produced (400) and transmitted to viewers in lieu of the interrupted video transmission.

17 Claims, 5 Drawing Sheets

METHOD AND SYSTEM FOR PROVIDING AND TRANSMITTING ALTERNATIVE VIDEO DATA DURING INTERRUPTIONS IN VIDEO TRANSMISSIONS

FIELD OF INVENTION

The present invention relates generally to video transmission systems and, more particularly, to providing and transmitting alternative video data files in place of an interrupted video transmission.

BACKGROUND OF THE INVENTION

During a video transmission there are often occasions where there is a need to blank the transmission i.e. halt the current transmission of images from the sending side to the receiving side. This may arise, for example, during a video conference where blanking the outgoing video from one party is desirable to keep the receiving party from viewing confidential discussions of the sending party. In the field of video telephony, where limited bandwidth is typically an issue, blanking a video call session or blanking to interrupt a live video transmission may also be desirable when e.g. transferring relatively large files that may take a considerable time to complete. Other examples include blanking the transmission when there is a glitch or technical problem during a video transmission such as during a film broadcast, for example. One straightforward way to perform a blanking operation is to transmit a constant "blackened-out" image to the receiving party during the intermission i.e. to simply terminate the transmission. However, a terminated blank image is usually not visually pleasing to view by the receiving party. Thus it would be desirable to display an alternative image during these blanked intermission periods.

Advanced wireless telecommunication services such as those proposed for use with high bit-rate third generation (3G) systems such as Universal Mobile Telephone Service (UMTS) or even lower bit-rate systems such as High Speed Circuit Switched Data (HSCSD) and General Packet Radio Service (GPRS) specified for use with the Global System for Mobile Communications (GSM) wireless standard, will occasionally encounter situations where blanking is necessary during video transmissions. High bandwidth services such as video phone calls, conferencing, simultaneous voice and data services are expected to be supported and will likely place a significant bandwidth load on these systems thereby potentially increasing download times or blanking periods for users of said services. There are a number of existing techniques that can be employed to blank the video in video transmission systems. One very simple but effective technique is to use a mechanical shutter to block the lens of the camera that is transmitting images to the receiver.

FIG. 1a shows a simplified block diagram of the transmitting portion of a basic video telephony system. In the system, an object 100 whose image is to be transmitted is located in front of a camera 110. The light sensitive elements of the camera 110 transform the image into a suitable digitized format that is capable of being stored in a memory 120. In practice, the memory 120 can be a random access memory (RAM) or flash memory, for example, or any suitable medium capable of storing digital data for subsequent retrieval. It should be noted that memory 120 typically functions as an intermediate storage buffer which may not contain a complete image and wherein perhaps only portions of video data from the camera may be briefly stored at any one instant in time. From memory 120, the image data is sent to a video encoder 130 in order to compress the image into a more manageable size. By way of example, an image the size of 38016 bytes or 304128 bits transmitted at 10 frames per second would require a bit rate of 3 Mbit/s. Typical bit rates used in video transmission are in the neighborhood of 50 kbit/s thereby requiring the image to be compressed, which is performed by the encoder by taking advantage of temporal and spatial redundancy and removing the irrelevant information. From the encoder 130, the encoded image data then is sent to a multiplexer 140 which combines the encoded video data and the encoded audio data into a single data stream for transmission.

FIG. 1b shows the video telephony system of FIG. 1a using mechanical shutter means for blanking the image transmission. Presently, many commercial systems use a mechanical shutter 115 to physically block light from the object 100 from reaching the light sensitive elements in camera 110'. This produces the "blackened-out" effect which the receiving party sees when the shutter is closed. Typically, the shutter arrangement 115 is integrated into the apparatus of the camera 110' and works in cooperation with the lens to manually block light from entering the camera 110'.

A disadvantage of using a mechanical shutter solution for blanking in video transmission systems is that it is typically cumbersome to operate and can lead to inaccurate performance i.e. it is often difficult to perform blanking with precise timing of better than $\frac{1}{1000}^{th}$ of a second with mechanical shutters, for example. Moreover, incorporated mechanical shutters are specially constructed assemblies and cannot be incorporated into many camera constructions. Most importantly, simple mechanical blanking limits the option for providing alternative images which are typically more pleasant to view during the blanking period.

SUMMARY OF THE INVENTION

Briefly described and in accordance with an embodiment and related features thereof, in a method aspect there is provided In a video transmission system comprising a camera, a memory for storing electronic images captured from said camera, and a video encoder for encoding said electronic images, a method of transmitting alternative visual data in lieu of a video transmission during an interruption in the video transmission, the method comprising the steps of:

interrupting the video transmission;

transferring said visual data into said video transmission system in response to said interrupted video transmission; and transmitting said visual data in lieu of said video transmission.

In an system aspect, there is provided a video transmission system comprising camera, a memory for interim storage of digitized images captured from said camera, and a video encoder for encoding said electronic images, wherein a video signal comprising the digitized images from said camera is transmitted to recipient viewers, characterized in that the video transmission system is adapted to transmit an alternative video data file for transmission to the viewers in lieu of the video signal that has been interrupted.

In an apparatus aspect, there is provided a wireless handheld device capable of sending and receiving audio and video transmissions for use in making video phone calls comprising:

a camera for capturing images used in connection with said video phone call;

a memory for storing said captured images;

an image generator for producing a generated image for transmission to viewers in lieu of an interrupted video transmission;

an audio encoder for encoding and decoding audio signals associated with said video phone call; and a video encoder for encoding said captured images associated with said video phone call.

BRIEF DESCRIPTION OF THE DRAWINGS

The invention, together with further objectives and advantages thereof, may best be understood by reference to the following description taken in conjunction with the accompanying drawings in which.

DETAILED DESCRIPTION OF THE INVENTION

As put forth by multiple aspects of the present invention, a method is disclosed for transmitting a previously stored digitized image during a blanking period during a video transmission. The method is particularly suitable for use in a wireless video telephony system and involves transferring the digitized image into an interim memory location from a storage medium which can be quickly accessed for transfer at a suitable time.

Figure 1A:
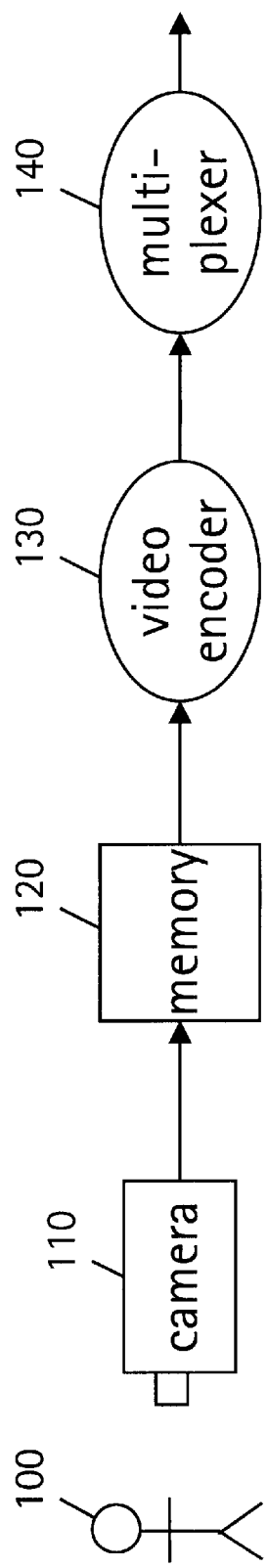
FIG. 1a shows a simplified block diagram of the transmitting portion of a basic video telephony system.
Figure 1B:
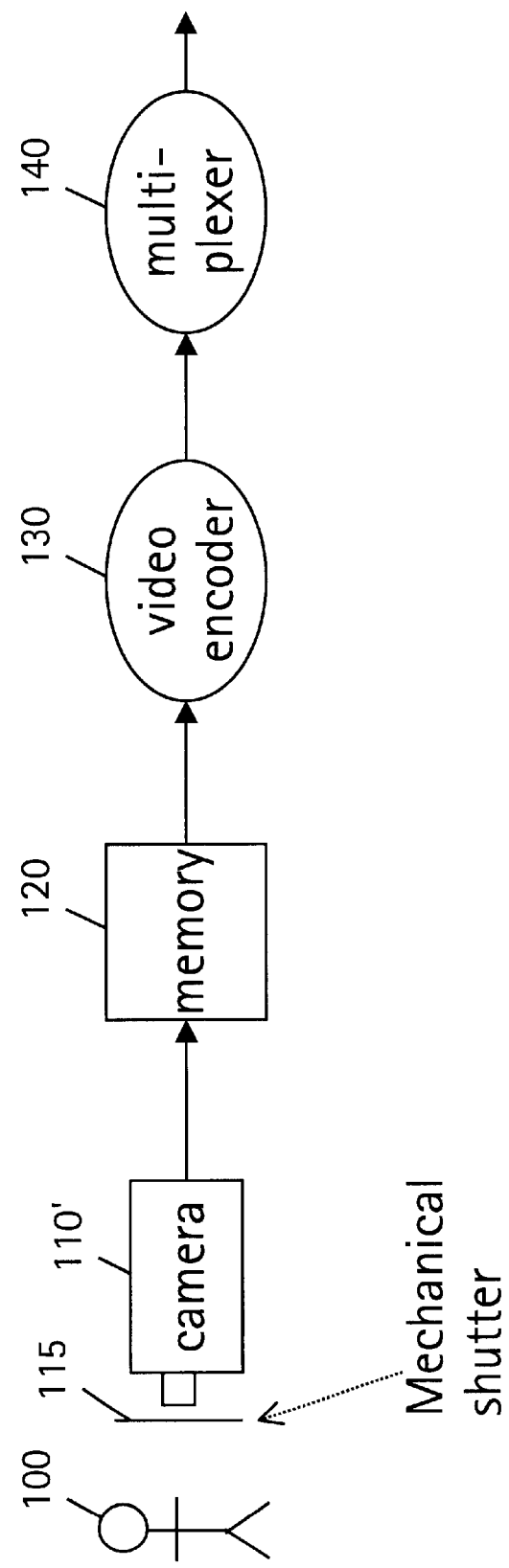
FIG. 1b shows a simplified block diagram of the transmitting portion of a basic video telephony system having mechanical blanking means.
Figure 2:
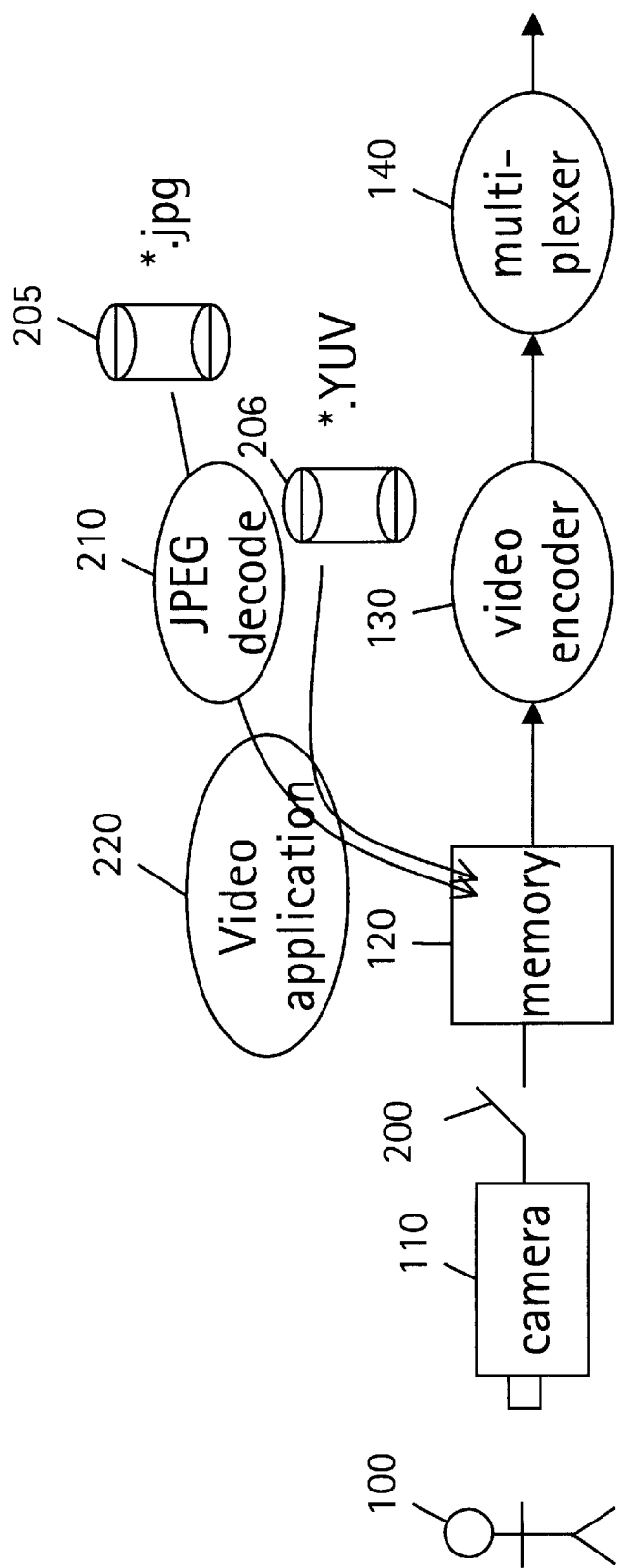
FIG. 2 shows a video telephony system capable of inserting digitized images while blanking in accordance with a first aspect of the invention.

FIG. 2 shows a simplified block diagram of the transmitting portion of a basic video telephony system operating in accordance with a first embodiment of the invention. While transmitting under normal conditions, the system operates in a similar manner as described in FIG. 1a i.e. the image of object 100 is captured by camera 110 and converted into digitized form for intermediate storage in memory 120. The digitized image is then encoded via video encoder 130 and sent through multiplexer 140 for combining the video and audio data streams for transmission. In a wireless video telephony system, the wireless handheld terminals that are adapted for use with the wireless video telephony system would contain camera 110 with possibly memory 120 and video encoder 130 in the terminal unit. The term handheld terminal is used herein to refer to portable devices such as mobile phones, handheld computers, personal digital assistants (PDAs), and communicator devices such as the Nokia 9110 and its successors.

In a first aspect of the invention, a digital image file is stored on a storage medium 205 in a standardized image format such as JPEG, for example. It should be noted that storage medium 205 may include any suitable type of data storage medium such as RAM memory, flash memory, a disk drive etc. JPEG (Joint Photographic Experts Group—the committee that developed the standard) is a widely used standard on computers for compressing still images that can be displayed with suitable viewing software. The original high quality images that are compressed (encoded) into JPEG format make them especially suitable for transferring and storing the files. Images that are encoded must be decoded into its original digitized form with a JPEG decoder 210 (typically software) prior to being transferred to memory 120.

Other suitable types of image formats that can be used with the invention include GIF (Graphics Interchange Format), JPEG2000, and PNG (Portable Network Graphics). GIF images are another much used format that defines a protocol designed for easy transmission of raster graphic data in a way that is independent of the hardware used for their creation or display. JPEG2000 is a successive enhancement of JPEG that provides advanced features and better coding efficiency and PNG, developed by the W3C organization, is an extensible format for the lossless, portable, well-compressed storage of raster images.

Once decoded, the image file is transferred to memory 120 for transmission to the receiving party via the normal video telephony transmission procedures. Video Application 220 represents a viewing application and associated user interface for use in a video telephone session. Typically the JPEG decoder is available to many applications in a similar to way as image viewers are available to web browsers, for example.

In an example involving blanking during a video transmission, the process may be triggered when e.g. it is desired to block the viewer from observing the sending party during a transmission or when initiating a file download that may take significant amount of time. Events of this type can be configured to initiate blanking. At that precise moment, a switch 200 located between the camera 110 and memory 120 is opened breaking off the current transmission. The decoded file is then transferred into memory 120 which is viewed by the receiver in lieu of the terminated transmission. As known by those skilled in the art, the image files can be stored on a storage medium in a format already compatible with the encoder 130 thereby increasing response time by circumventing decoding step 210 thereby enabling faster loading into memory 120.

Similarly, images in an alternative format such as YUV can be transferred from a storage medium 206 in a similar procedure as described above. It should be noted that the storage medium 206 is shown for purpose of illustration but in practice a single storage medium could be used. As known by those skilled in the art, YUV is the raw uncompressed still images of video containing both luminance in the Y portion and chrominance information in the U and V portions. Similarly a decoder (not shown) working together with the Video Application 220 is used to decode the images in order to viewed by the users. It should be noted that the image files could be stored on the storage mediums in pre-encoded form thereby not requiring the decoding step as described. The invention enables the use of more complex and visually aesthetic images for the viewers. In addition, the images could be used to convey messages to viewers by including suitable text. It should be noted however that when a simple "blank" screen is desired to be transmitted (electronic blanking), this can be achieved by downloading a "black" image file into memory 120.

In a second aspect of the invention, moving image clips are inserted in place of still images during the blanking period. Multimedia clips, which may include moving image clips (such as movie clips that may include sound) or a series of still images, are often more interesting and visually stimulating for many viewers. They also provide the opportunity to convey information in a more efficient manner relative to still images. By way of example, a video phone call between a stock broker and client may include blanking periods or pauses in which related financial information may be displayed. Multimedia clips also may provide an effective means for advertising to targeted viewers during blanking pauses thereby enabling a business model in which revenue could be collected from advertisers e.g. showing commercials while awaiting large file transfers to complete.

Figure 3:
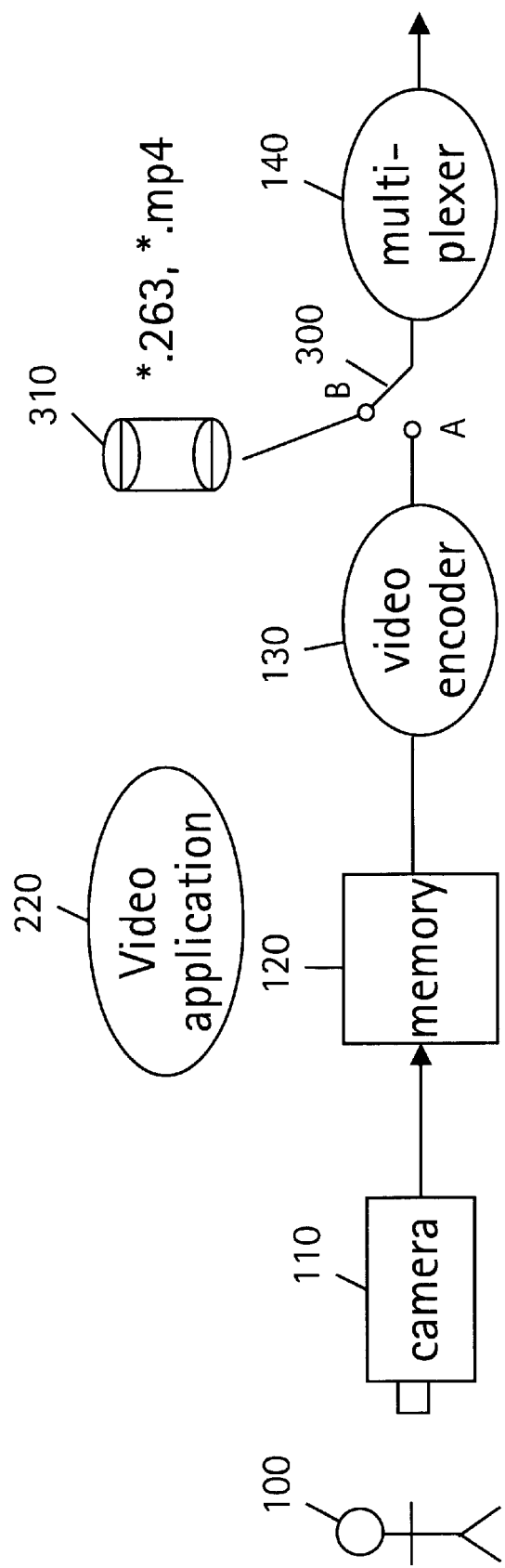
FIG. 3 shows a video telephony system capable of inserting multimedia clips while blanking in accordance with a second aspect of the invention.

FIG. 3 shows a video telephony system capable of inserting multimedia clips into a video telephony system in accordance with the second aspect of the invention. In this embodiment, a storage medium 310 is shown to contain pre-encoded video data stored in a suitable format such as H.263 or MPEG-4, for example. H.263 is a provisional ITUT (International Telecommunication Union Standardization Sector) standard that was designed for low bit-rate applications which are particularly suitable for use in low bandwidth environments such as mobile communications. MPEG-4 is a low bit-rate standard developed by the Moving Picture Experts Group for coded representation of digital audio and video.

The operation of the blanking technique is demonstrated by first interrupting the current transmission by opening switch 300 placed between video encoder 130 and multiplexer 140 from position A. In response to the switch 300 being opened to position B, a multimedia clip stored on storage medium 310 is automatically fed into the multiplexer 140 and transmitted to the viewers in place of the interrupted real-time encoded transmission. The operation is typically performed and controlled under the direction of the Video Application 220 (although not shown in FIG. 3). Other operations controlled by the Video Application include selecting and opening the correct data file and feeding it at the proper speed to the multiplexer 140. Generally, the data file is compatible for direct use by the video telephony system i.e. is properly encoded to be fed directly to the multiplexer, as shown in the figure. In this case where the stored data file is not compatible for direct use by the system, the data file must be suitably encoded via encoder 130 which may increase the transition time until the clip is played. With a pre-encoded multimedia clip thus subsequent encoding would not be necessary thereby reducing the transition time.

In one implementation, the video encoder may include a mode that allows it to fetch a file from a plurality existing data files. One way of doing this is for the video encoder's Application Programming Interface (API) to include a call function comprising a file name as a parameter, for example. The retrieved data file typically begins with an intracoded frame (first frame) and may be followed by typically intercoded frames. This enables the video clip to be looped at the proper moment. As known by those skilled in the art, intra-coding refers to a process by which no prediction from previously coded frames is used when coding the current image. Likewise inter-coding refers to using the previous frame to predict the current frame for coding. This is advantageous when there are relatively small changes in content between consecutive images thereby leading to significant coding gain.

In a third aspect of the invention, a video image is generated by embedded software operating together with the Video Application 220 such that the image is transferred into memory for display to the viewing party, as opposed to being downloaded from a separate storage entity.

Figure 4:
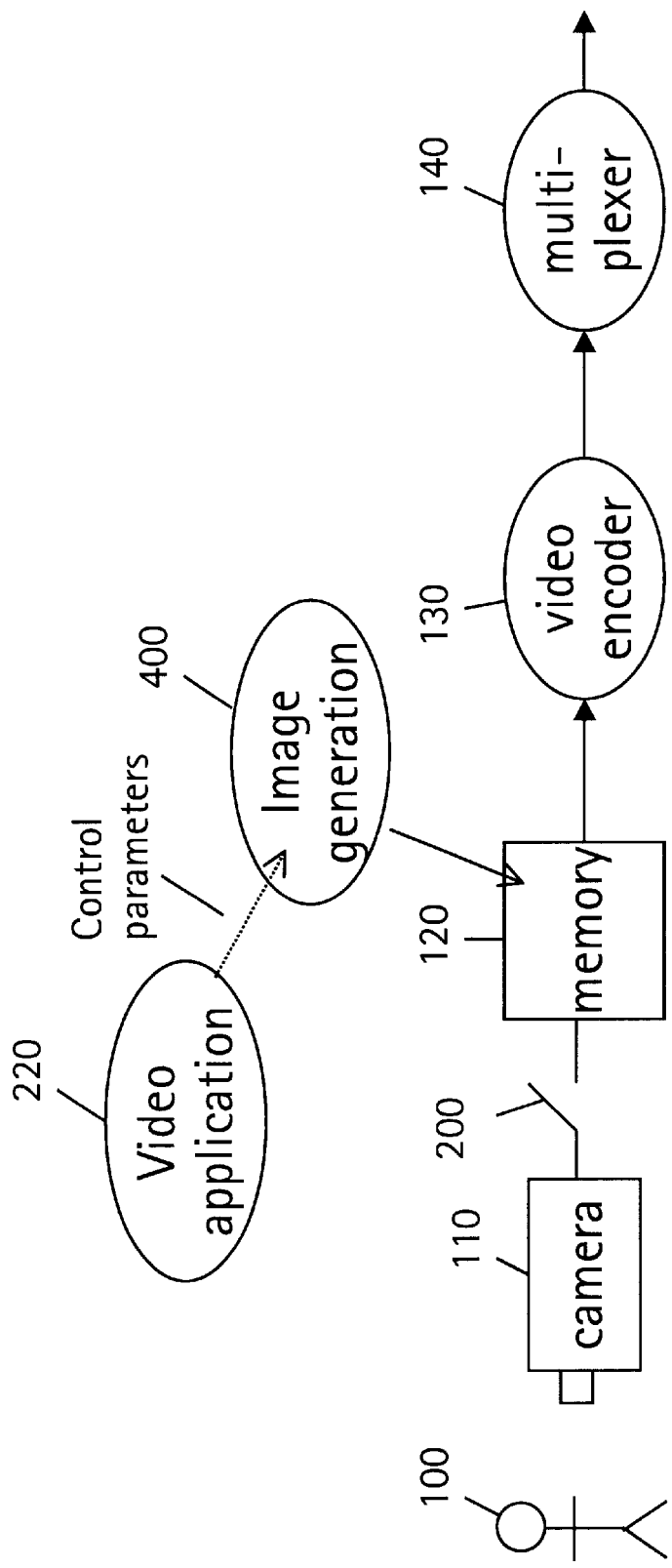
FIG. 4 shows a video telephony system capable of inserting generated images in accordance with the third aspect of the invention.

FIG. 4 shows a video telephony system capable of inserting generated images in accordance with the third aspect of the invention. In one example of the blanking scenario, the video transmission is interrupted via switch 200 between the camera 110 and memory 120. The Video Application 220 then sends a set of control parameters that specify the generated image in the image generation process 400, which can be in real time. In one example, the same processor running the Video Application 120 is used in the image generating process 400 by executing embedded software used to generate the images. Alternatively, the controlling software for the image generating process 400 may be executed by any available processing engine in the system such as that of the video encoder 130. The control parameters may include e.g. size constraints such as the width and height of the image and color information such as YUV values and those for specifying contrast, brightness etc. Furthermore, a text string may be specified for display with the image where the composite generated image is then transferred into memory 120 for transmission to viewers in the previously described manner. It should also be mentioned that with sufficient processing power, the image generation process can include multimedia and movie clips in the fashion previously described, in addition to presenting a series of still images.

The illustrated arrangement is especially suitable for embodiment into a single device such as a wireless handheld device e.g. a wireless video phone. Current technology permits the necessary components such as a miniature camera 110, memory 120, video encoder 130 etc., in addition to the software processes of the Video Application 220 and image generator component 400, can quite reasonably be incorporated into a small handheld device.

The present invention contemplates a method of transmitting an alternative video signal during a blanking intermission in, for example, a video telephony transmission. As previously discussed, the technique enables the recipient to view aesthetic or informative information during transmission gaps that may be induced by any number of means. The invention may find additional motivation in the fact that limited bandwidth in video telephony systems may result in deteriorating video quality in transmissions while simultaneously transferring large files. Thus transmitting a relatively low bit rate image or clip may increase the data transfer rate of the files thereby enabling more efficient use of the available bandwidth.

Although the invention has been described in some respects with reference to a specified embodiment thereof, variations and modifications will become apparent to those skilled in the art. In particular, the inventive concept may be applied to applications other than video telephony such as an internet based multimedia transmission system where limited bandwidth is an issue during long file transfers, for example. Moreover, although the embodiment and related aspects are described generally with reference to a mobile video telephony system the invention is applicable to wired or fixed video telephony systems as well. It is therefore the intention that the following claims not be given a restrictive interpretation but should be viewed to encompass variations and modifications that are derived from the inventive subject matter disclosed.

What is claimed is:

1. In a video transmission system comprising a camera, a memory for storing electronic images captured from said camera, and a video encoder for encoding said electronic images, a method of transmitting alternative visual data in lieu of a video transmission during an interruption in the video transmission, the method comprising the steps of:

interrupting intentionally the video transmission;

transferring said visual data into said video transmission system in response to said interrupted video transmission;

transmitting said visual data in lieu of said video transmission; and wherein said visual data is generated by software and transmitted during the interruption of the video transmission.

2. A method according to claim 1 wherein said video transmission is conducted through a mobile video telephony system.

3. A method according to claim 1 wherein said transferring step comprises downloading said visual data from a storage medium such as a RAM, flash memory, or a disk drive.

4. A method according to claim 3 wherein said transferring step includes converting a still image in a format such a JPEG, YUV, GIF, JPEG200, and PNG into a format compatible with said video encoder for downloading into said memory.

5. A method according to claim 1 wherein said transferring step includes transferring a movie clip in a format such as MPEG-4 or H.263 from said storage medium for transmission in lieu of the interrupted video transmission.

6. A method according to claim 1 wherein said transferring step includes downloading visual data configured to display a blank screen.

7. A method according to claim 1 wherein the visual data stored in the storage medium is pre-encoded or already compatible for use with said video transmission system.

8. A method according to claim 1 wherein the visual data is transmitted during a long data file transfer.

9. A video transmission system comprising camera, a memory for interim storage of digitized images captured from said camera, and a video encoder for encoding said electronic images, wherein a video signal comprising the digitized images from said camera is transmitted to recipient viewers, wherein the video transmission system is adapted to transmit an alternative video data file for transmission to the viewers in lieu of the video signal that has been intentionally interrupted, said video data file generated by software and transmitted during the interruption of the video transmission.

10. A video transmission system according to claim 9 wherein said video transmission system is a wireless video telephony system adapted for use with a plurality of wireless handheld terminals, wherein said camera is housed in the handheld terminal.

11. A video transmission system according to claim 9 wherein said alternative video data file is provided by an image generator in functional connection with said transmission system.

12. A video transmission system according to claim 9 wherein said alternative video data file is provided by a storage medium having a plurality of said video data files stored thereon, and wherein the storage medium is in functional connection with said transmission system.

13. A video transmission system according to claim 12 wherein said storage medium is a RAM, flash memory, or a disk drive.

14. A video transmission system according to claim 9 wherein said data file are stored in a format consisting of any one of formats consisting of JPEG, YUV, GIF, JPEG2000, PNG, H.263 and MPEG-4 multimedia clips.

15. A video transmission system according to claim 14 wherein said multimedia clips are pre-encoded.

16. A wireless handheld device capable of sending and receiving audio and video transmissions for use in making video phone calls comprising:

a camera for capturing images used in connection with said video phone call;

a memory for storing said captured images;

an image generator for producing a generated image for transmission to viewers in lieu of an intentionally interrupted video transmission, said generated image generated by software and transmitted during the interruption of the video transmission;

an audio encoder for encoding and decoding audio signals associated with said video phone call; and a video encoder for encoding said captured images associated with said video phone call.

17. A device according to claim 16 wherein said device includes a multiplexer for combining said encoded video images and said encoded audio signal into a single data stream transmission to a receiving party associated with the video phone call.

* * * * *